(12) United States Patent
Chen et al.

(10) Patent No.: US 9,291,169 B2
(45) Date of Patent: Mar. 22, 2016

(54) FAN MOTOR CONTROL DEVICE

(71) Applicant: Asia Vital Components Co., Ltd., New Taipei (TW)

(72) Inventors: Mao-Lin Chen, New Taipei (TW); Chih-Chiang Chao, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 118 days.

(21) Appl. No.: 14/102,815

(22) Filed: Dec. 11, 2013

(65) Prior Publication Data

US 2015/0159663 A1 Jun. 11, 2015

(51) Int. Cl.
*H02P 27/00* (2006.01)
*H02P 6/00* (2006.01)
*F04D 27/00* (2006.01)
*F04D 25/08* (2006.01)
*H02P 23/06* (2006.01)
*F04D 25/06* (2006.01)

(52) U.S. Cl.
CPC .......... *F04D 27/004* (2013.01); *F04D 25/0613* (2013.01); *F04D 25/08* (2013.01); *F04D 27/001* (2013.01); *H02P 23/065* (2013.01)

(58) Field of Classification Search
CPC ....... F04D 27/004; F04D 25/08; F04D 25/06; H02P 23/065
USPC ......................................................... 318/816
See application file for complete search history.

(56) References Cited

U.S. PATENT DOCUMENTS

| | | | |
|---|---|---|---|
| 5,137,428 A * | 8/1992 | Poll et al. ......................... | 417/45 |
| 8,878,472 B2 * | 11/2014 | Satake et al. .............. | 318/400.06 |
| 2006/0263073 A1 * | 11/2006 | Clarke et al. .................. | 392/347 |
| 2012/0268047 A1 * | 10/2012 | Suzuki et al. ............ | 318/400.04 |
| 2014/0035501 A1 * | 2/2014 | Harada ...................... | 318/400.35 |
| 2014/0070769 A1 * | 3/2014 | Harada .......................... | 320/109 |

* cited by examiner

*Primary Examiner* — Eduardo Colon Santana
*Assistant Examiner* — Gabriel Agared
(74) *Attorney, Agent, or Firm* — C. G. Mersereau; Nikolai & Mersereau, P.A.

(57) ABSTRACT

A fan motor control device includes a zero-crossing detection unit, a phase control unit, an operation processing unit, a first rectifier element and a second rectifier element. The zero-crossing unit generates a synchronization reference signal to the phase control unit, which in turn generates a phase control signal to the operation processing unit. According to the received phase control unit, the operation processing unit generates a motor-starting processing signal to the first and the second rectifier element for driving a fan motor to rotate. Since the phase control unit provides the effect of controlling the fan motor's output power and rotational speed, it enables the fan to have increased rotational speed and provide improved heat dissipation and ventilation effects.

6 Claims, 3 Drawing Sheets

FAN MOTOR CONTROL DEVICE

FIELD OF THE INVENTION

The present invention relates to a fan motor control device, and more particularly, to a fan motor control device that effectively enables a fan to have increased rotational speed and provide improved heat dissipation and ventilation effects.

BACKGROUND OF THE INVENTION

The reliance placed on various electronic devices by people increases with technological progress. For most electronic devices, such as desk computers and notebook computers, electronic elements thereof will produce a large quantity of heat when they operate. The produced heat must be timely guided away from the electronic devices to avoid the problem of overheating.

Taking a computer as an example, it internally includes some heat-producing elements, including but not limited to a central processing unit (CPU) and a power supply. When the computer is in use, the CPU produces a high amount of heat when it performs operation for data processing at a high speed. The produced heat renders the CPU in an unstable state, which might cause the computer to crash in some less serious conditions. However, in some worse conditions, the produced heat could result in burnout or damage of the CPU.

Presently, a general way for solving the problem of heat dissipation is to provide at least one cooling fan in the computer, so that the heat produced by the CPU can be quickly guided to a space outside the computer by the cooling fan through forced heat dissipation.

Generally, a cooling fan uses a single-phase alternating-current (AC) motor. For a single-phase induction motor, a single-phase power does not produce a rotating magnetic field. More specifically, the single-phase power produces a magnetic field that is changeable in its magnitude but not in its direction and therefore can not be used to start the fan's motor. Therefore, the magnetic field produced by supplying the alternating current to a stator coil of the fan motor should not be a fixed magnetic field but a changeable magnetic filed that has N pole and S pole changed with time. By taking advantage of this characteristic, it is possible to design a surrounding magnetic field that can push a rotor of the fan motor at different times and from different positions, so that the rotor rotates continuously.

For this reason, the single-phase power supplied to the single-phase induction motor must be converted into a two-phase power for starting the motor. Therefore, in the single-phase induction motor, there must be at least two-phase windings. The process of converting single-phase power into two-phase power is referred to as phase splitting. There are two types of single-phase AC motors, namely, resistance-start induction motor and capacitance-start motor, each of which performs phase-splitting in a different way. And the capacitance-start induction motor is more common in use.

A main structural form of the capacitance-start induction motor is the two-phase AC motor, which is characterized by having a capacitance applied across the motor wiring consisting of silicon steel plates and coils to create a phase shift, so that a phase difference occurs in the power supplied to the electrical magnets so formed to drive the motor to rotate.

Generally, the capacitance-start induction motor has somewhat poor energy conversion efficiency mainly because its major elements, such as the silicon steel plates, the coils, the capacitor elements and the voltage all are unchanged. As a result, the capacitance-start induction motor fails to have increased rotational speed and can not control its output power according to requirements. These problems in turn adversely influence the fan's heat dissipation and ventilation effects.

SUMMARY OF THE INVENTION

A primary object of the present invention is to provide a fan motor control device that enables a fan to have increased rotational speed and provide improved heat dissipation and ventilation effects.

Another object of the present invention is to provide a fan motor control device that enables omission of the conventional rectifying and filtering circuit for power input to thereby reduce the space needed by a circuit board of the fan.

To achieve the above and other objects, the fan motor control device according to the present invention includes a zero-crossing detection unit, a phase control unit, an operation processing unit, a first rectifier element and a second rectifier element. The zero-crossing detection unit, after being supplied with electric power, generates a synchronization reference signal to the phase control unit, which is electrically connected to the zero-crossing detection unit. According to the received synchronization reference signal, the phase control unit generates a phase control signal for controlling motor's output power and rotational speed. The operation processing unit is electrically connected to the phase control unit and receives the phase control signal, according to which the operation processing unit generates a processing signal for motor starting. The first rectifier element is electrically connected to the operation processing unit and receives the processing signal, according to which the first rectifier element generates a first phase signal to a first coil unit. The second rectifier element is also electrically connected to the operation processing unit and receives the processing signal, according to which the second rectifier element generates a second phase signal to a second coil unit, so that the fan motor is driven to rotate according to one of the first and the second phase signal. With these arrangements, the phase control unit is able to control the fan motor's output power and rotational speed, enabling a fan to have increased rotational speed and provide improved heat dissipation and ventilation effects.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
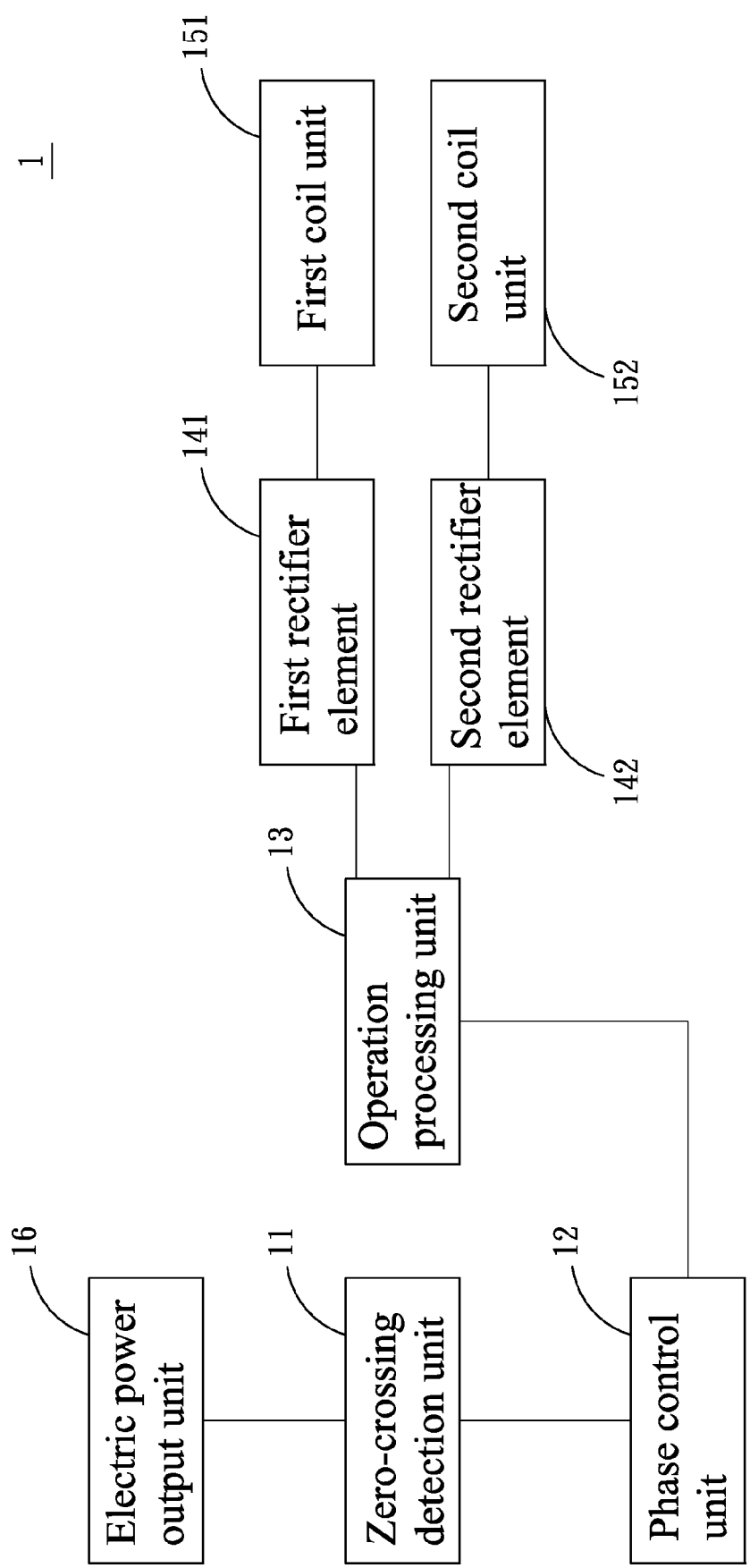
FIG. 1 is a block diagram of a first preferred embodiment of the present invention.

The present invention will now be described with some preferred embodiments thereof and with reference to the accompanying drawings. For the purpose of easy to understand, elements that are the same in the preferred embodiments are denoted by the same reference numerals.

The present invention relates to a fan motor control device 1. Please refer to FIG. 1, which is a block diagram of a first preferred embodiment of the present invention. As shown, the fan motor control device 1 in the first preferred embodiment includes a zero-crossing detection unit 11, a phase control unit 12, an operation processing unit 13, a first rectifier element 141, and a second rectifier element 142. The zero-crossing detection unit 11 is electrically connected to the phase control unit 12, which is further electrically connected to the operation processing unit 13. The operation processing unit 13 is further electrically connected to both of the first rectifier element 141 and the second rectifier element 142. And, the first and the second rectifier element 141, 142 are electrically connected to a first coil unit 151 and a second coil unit 152, respectively.

The fan motor control device 1 in the first embodiment further includes an electric power output unit 16 electrically connected to the zero-crossing detection unit 11 for supplying electric power to the latter. The electric power output unit 16 also generates a square wave signal to the zero-crossing detection unit 11 at the same time the electric power is supplied to the zero-crossing detection unit 11. The zero-crossing detection unit 11 detects zero-crossings of voltage of the supplied power. That is, the zero-crossing detection unit 11 detects the positive and negative half cycles as well as the positive and negative zero-crossings of the input voltage, and generates a corresponding square wave and positive pulse signal. Meanwhile, the zero-crossing detection unit 11 also generates a synchronization reference signal, which is provided to a back end for use as a reference of synchronization.

The phase control unit 12 receives the synchronization reference signal and applies the same to an alternating current (AC) sine wave to change the latter's turn-on angle for controlling the magnitude of the input voltage, so as to regulate the magnitude of the output voltage and of the output power. That is, the phase control unit 12 receives the synchronization reference signal and applies the same to an AC sine wave, and changes the turn-on angle of the AC sine wave according to the synchronization reference signal, so as to control the magnitude of the input voltage and generates a phase control signal for controlling the motor's output power and rotational speed.

The phase control signal generated by the phase control unit 12 is sent to the operation processing unit 13, which is a microcontroller unit (MCU) according to a preferred embodiment of the present invention. The operation processing unit 13 receives the phase control signal and performs an operation on parameters obtained from the phase control signal to generate a processing signal for motor starting.

The processing signal is sent to the first and the second rectifier element 141, 142. In the present invention, the first and second rectifier elements 141, 142 are silicon controlled rectifiers and are used in place of the rectifying and filtering circuit used in the prior art to thereby reduce the space needed by a circuit board.

According to the received processing signal, the first rectifier element 141 generates a first phase signal to the first coil unit 151 electrically connected therewith. Meanwhile, according to the received processing signal, the second rectifier element 142 generates a second phase signal to the second coil unit 152 electrically connected therewith. The first phase signal and the second phase signal are inverted in phase, and only one of them is output each time. The output first or second phase signal is magnetically repulsive to corresponding stationary magnets inside the motor to thereby drive the fan motor to rotate. With these arrangements, the phase control unit 12 included in the present invention can control the motor's output power and the rotational speed, allowing the fan to have increased rotational speed and provide improved heat dissipation and ventilation effects.

Figure 2:
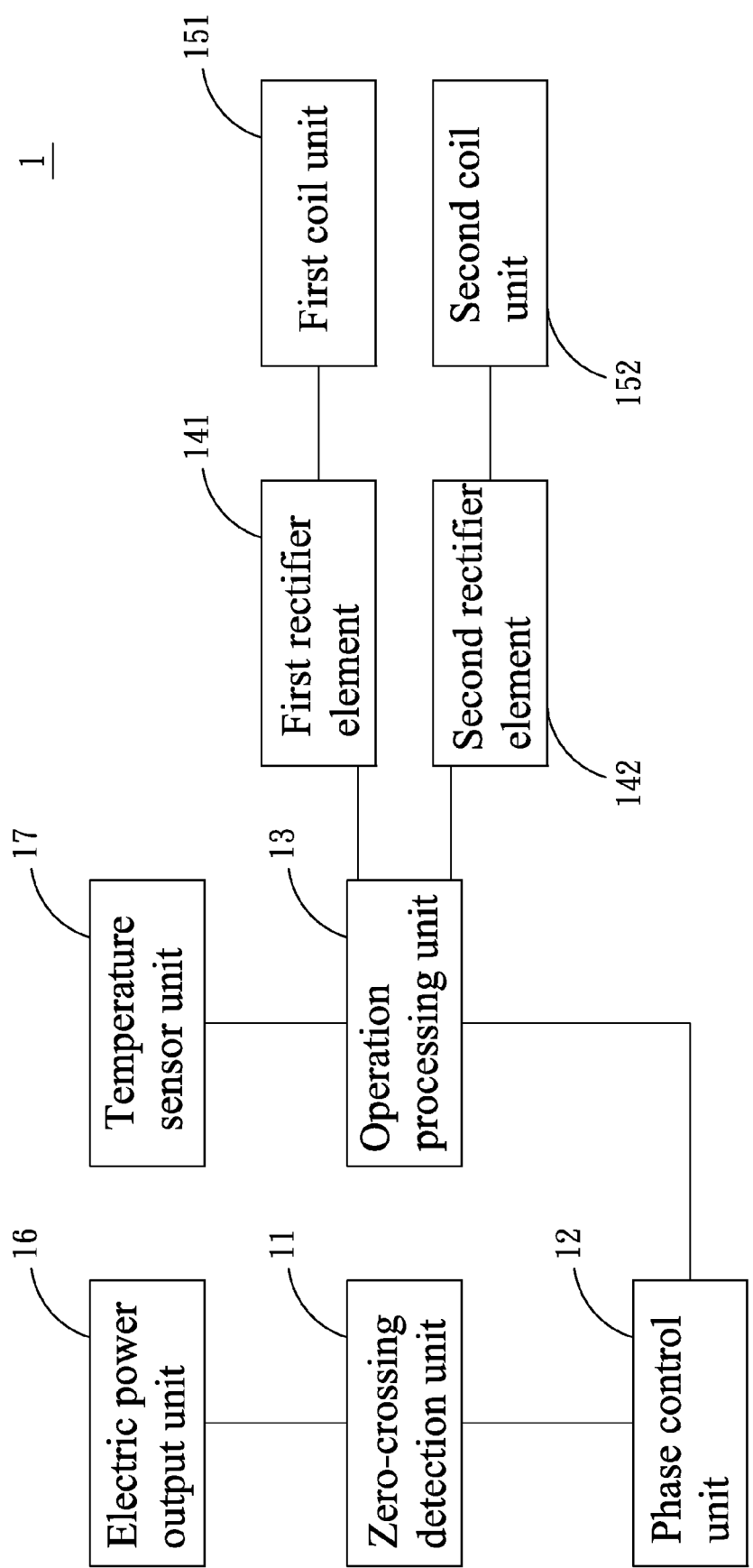
FIG. 2 is a block diagram of a second preferred embodiment of the present invention.

FIG. 2 is a block diagram of a second preferred embodiment of the present invention. As shown, the second preferred embodiment is generally structurally similar to the first preferred embodiment, but further includes a temperature sensor unit 17 for detecting ambient temperature and generating a corresponding temperature sensing signal to the operation processing unit 13. According to parameters obtained from the phase control signal and the temperature sensing signal, the operation processing unit 13 performs an operation and generates the processing signal. Therefore, the fan motor control device 1 can regulate the fan's rotational speed as required according to the detected ambient temperature, allowing the fan to provide improved heat dissipation and ventilation effects.

Figure 3:
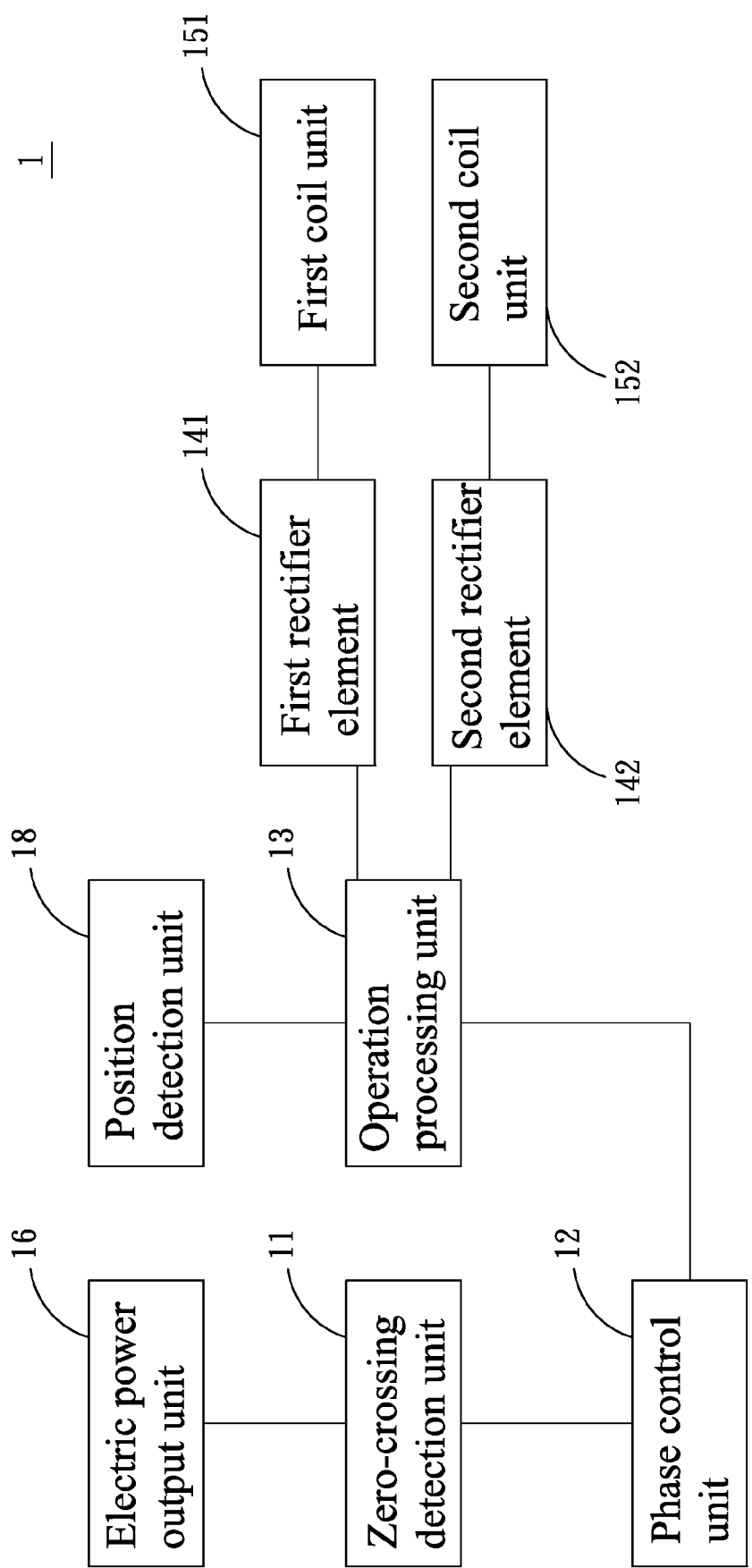
FIG. 3 is a block diagram of a third preferred embodiment of the present invention.

FIG. 3 is a block diagram of a third preferred embodiment of the present invention. As shown, the third preferred embodiment is generally structurally similar to the first preferred embodiment, but further includes a position detection unit 18 for detecting a position at where the motor stopped rotating in last operation and generating a position detection signal to the operation processing unit 13. According to the parameters obtained from the phase control signal and the position detection signal, the operation processing unit 13 performs an operation and generates the processing signal for controlling the fan motor control device 1 to restart operating from the first coil unit 151 or the second coil unit 152.

In conclusion, the present invention is superior to the prior art due to the following advantages: (1) it can increase the fan's rotational speed; (2) it enables the fan to provide improved heat dissipation and ventilation effects; and (3) it reduces the space needed by the circuit board.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fan motor control device for use with a fan motor, comprising:

a zero-crossing detection unit being supplied with electric power and receiving a square wave signal from an electric power output unit which the zero-crossing detection unit detects zero-crossings of voltage of the electric power supplied from the electric power output unit and that generates a synchronization reference signal;

a phase control unit being electrically connected to the zero-crossing detection unit for receiving the synchronization reference signal, and generating a phase control signal according to the synchronization reference signal for controlling the fan motor's output power and rotational speed;

an operation processing unit being electrically connected to the phase control unit and generating a processing signal according to the phase control signal;

a first rectifier element being electrically connected to the operation processing unit and generating a first phase signal according to the processing signal for sending to a first coil unit;

a second rectifier element being electrically connected to the operation processing unit and generating a second phase signal according to the processing signal for sending to a second coil unit;

whereby the fan motor is driven to rotate according to one of the first phase signal and the second phase signal; and wherein the phase control unit applies the received synchronization reference signal to an AC sine wave and changes a turn-on angle of the AC sine wave according to the synchronization reference signal, so as to control a voltage magnitude of the supplied electric power and generate the phase control signal for controlling the fan motor's output power and rotational speed.

2. The fan motor control device as claimed in claim 1, wherein the first phase signal and the second phase signal are inverted in phase.

3. The fan motor control device as claimed in claim 1, wherein only one of the first phase signal and the second phase signal is output each time for driving the fan motor to rotate.

4. The fan motor control device as claimed in claim 1, wherein the first and the second rectifier element are silicon controlled rectifiers.

5. The fan motor control device as claimed in claim 1, further comprising a temperature sensor unit for detecting ambient temperature and generating a temperature sensing signal to the operation processing unit; and the operation processing unit performing an operation according to the phase control signal and the temperature sensing signal to generate the processing signal.

6. The fan motor control device as claimed in claim 1, further comprising a position detection unit for detecting a position, at where the fan motor stopped rotating in last operation, and generating a position detection signal to the operation processing unit; and the operation processing unit performing an operation according to the phase control signal and the position detection signal to generate the processing signal.

* * * * *